(12) United States Patent
Coleman et al.

(10) Patent No.: US 9,669,730 B2
(45) Date of Patent: Jun. 6, 2017

(54) MAGNETIC TRACK SYSTEM FOR A TRANSPORT DEVICE, AND TRANSPORT DEVICE

(71) Applicant: ETEL S.A., Môtiers (CH)

(72) Inventors: Ralph Coleman, Fleurier (CH); Samuel Mottier, Neuchâtel (CH)

(73) Assignee: ETEL S.A., Môtiers (CH)

( * ) Notice: Subject to any disclaimer, the term of this patent is extended or adjusted under 35 U.S.C. 154(b) by 188 days.

(21) Appl. No.: 14/657,575

(22) Filed: Mar. 13, 2015

(65) Prior Publication Data
US 2015/0283916 A1  Oct. 8, 2015

(30) Foreign Application Priority Data
Apr. 8, 2014  (EP) .................................... 14163869

(51) Int. Cl.
  *B60L 13/04* (2006.01)
  *B65G 45/02* (2006.01)
  *H02K 41/03* (2006.01)
(52) U.S. Cl.
  CPC .............. *B60L 13/04* (2013.01); *B65G 45/02* (2013.01); *H02K 41/031* (2013.01); *H02K 2213/12* (2013.01)
(58) Field of Classification Search
  CPC .......... B60L 13/10; B60L 13/04; B60L 13/06; B60L 13/08; B60L 15/005; B60L 13/03; H02K 41/031; H02K 41/03; H02K 11/215; H02K 16/00; H02K 1/17; H02K 2213/03; H02K 2213/12; B65G 54/02; B65G 45/02
  See application file for complete search history.

(56) References Cited

U.S. PATENT DOCUMENTS

| 5,642,013 | A | 6/1997 | Wavre |
| 7,944,096 | B2* | 5/2011 | Wang ..................... H02K 41/03 310/12.25 |
| 8,210,343 | B2 | 7/2012 | Lykkegaard |
| 8,333,274 | B1 | 12/2012 | Lykkegaard |
| 8,384,251 | B2 | 2/2013 | Shikayama et al. |
| 8,502,422 | B2 | 8/2013 | Lykkegaard |
| 8,733,541 | B2 | 5/2014 | Van de Loecht et al. |
| 2010/0083851 | A1* | 4/2010 | Matscheko ............ H02K 16/00 100/214 |

FOREIGN PATENT DOCUMENTS

| DE | 10 2009 002 606 | 10/2008 |
| JP | 02-41650 | 2/1990 |
| WO | 2008/087130 | 7/2008 |
| WO | 2008/125121 | 10/2008 |

OTHER PUBLICATIONS

T. Erm, et al., "A Cost Effective Direct Option for the Thirty Meter Telescope," Proc. SPIE, vol. 6273, p. 627335, 2006.

* cited by examiner

*Primary Examiner* — Mark Le
(74) *Attorney, Agent, or Firm* — Andrews Kurth Kenyon LLP

(57) ABSTRACT

A magnetic track system for a transport device for moving a rotor along the magnetic track system includes a plurality of linear sections having an even number of magnets of alternating polarity, which are disposed on a support in each case, the magnetic orientation of the magnets reversing itself at regular intervals across abutting sections n the linear regions of the magnetic track system. In the curved regions of the magnetic track system, on the other hand, the polarity of two adjacent magnets of different sections is the same.

6 Claims, 1 Drawing Sheet

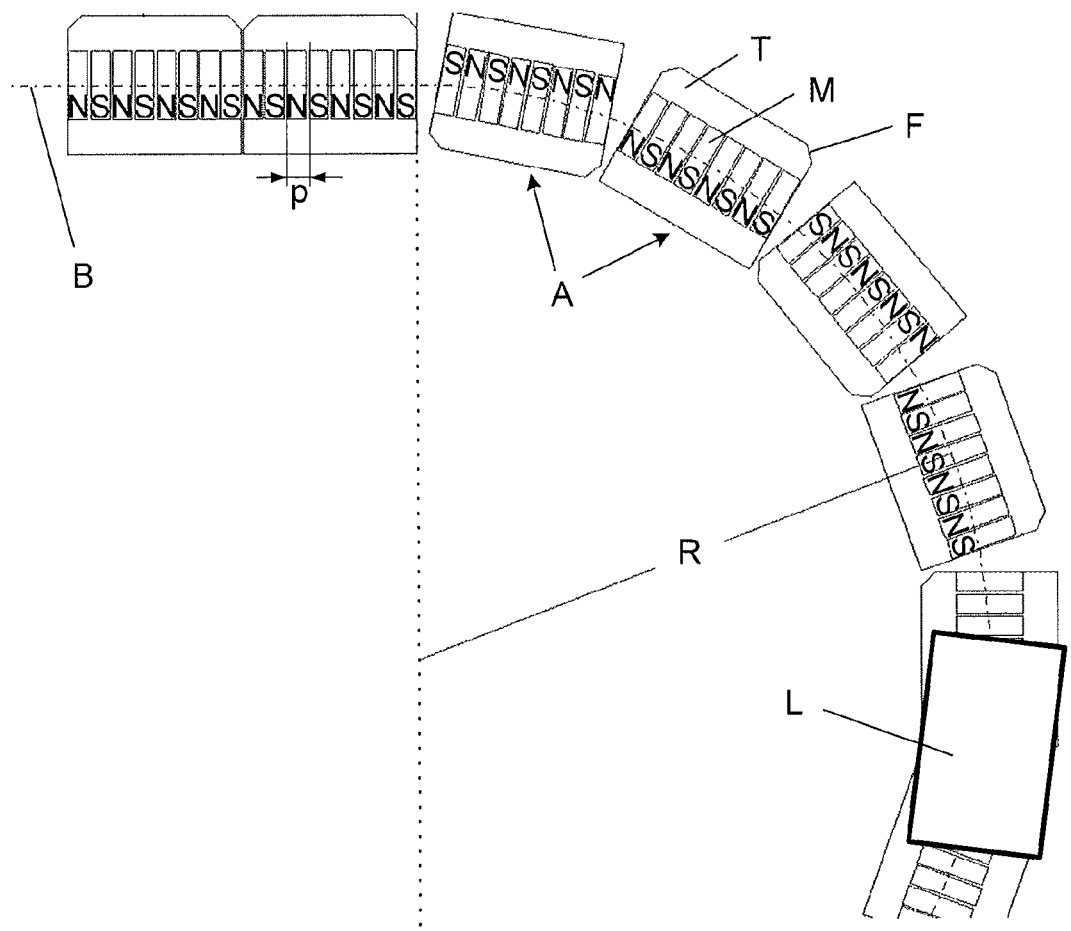

MAGNETIC TRACK SYSTEM FOR A TRANSPORT DEVICE, AND TRANSPORT DEVICE

CROSS-REFERENCE TO RELATED APPLICATIONS

The present application claims priority to Application No. 14163869.2, filed in the European Patent Office on Apr. 8, 2014, which is expressly incorporated herein in its entirety by reference thereto.

FIELD OF THE INVENTION

The present invention relates to a magnetic track system for a transport device, with the aid of which, for example, a plurality of rotors is able to be moved along the magnetic tracks. In addition, the present invention relates to a transport device which includes such a magnetic track system.

BACKGROUND INFORMATION

Transport devices of this type make it possible to move workpieces to and from multiple processing stations disposed along the magnetic track system. The magnetic track system includes both linear and curved regions and frequently forms a closed path. Linear motors, whose primary parts are located inside a rotor, are used as drives. Multiple rotors may share the secondary part, which is arranged as a magnetic track with magnets that are lined up next to each other in a regular pattern, and can be moved independently of each other.

U.S. Pat. No. 5,642,013 describes a linear motor, which is well-suited for a transport device of the type described herein because of its especially low cogging forces. The primary part of this linear motor consists of an iron core having straight tooth faces, around which coils are wound. The secondary part includes magnets of alternating polarity, which are placed next to each other in a regular pattern. FIG. 4 of U.S. Pat. No. 5,642,013 shows this linear motor especially clearly.

PCT International Published Patent Application No. WO 2008/087130 describes a device, in which a multitude of linear primary parts is movable along magnetic tracks arranged in the form of a circular path. While the primary parts in the rotors have a straight configuration, like in a linear motor, the magnets on the circular path have a radial alignment in order to obtain a regular magnetic period along the circular path. Moreover, the placement of the magnets must be adapted for each required radius of a circular path, which involves considerable expense.

German Published Patent Application No. 10 2009 002 606 describes a transport device, which has linear as well as curved regions and whose transport path is closed on itself. The transport path includes the primary part having regularly positioned coil elements, while the rotors have magnets of alternating polarity. In this particular case, the problem of the coil placement in the linear and curved regions is addressed by providing two paths, the inner of the two paths having coil elements aligned in parallel in the linear regions, and the outer of the two paths having coil elements that have a radial alignment in the direction of the radius of curvature in the curved regions. Accordingly, a rotor has magnets that have a parallel alignment as well as magnets that have a radial alignment. However, because of the radial alignment of the magnets in the rotors, a radius of curvature is fixedly specified. The transport path with its two different tracks is also relatively complex in its manufacture.

In the essay "A Cost Effective Direct Drive Option for the Thirty Meter Telescope," Proc. SPIE, Vol. 6273, 627335 (2006); DOI:10.1117/12.672204, a transport device based on standard components of a linear motor is described, by which a telescope having a large diameter is positioned on a circular path. Linear sections of the secondary part are sequentially placed at an angle with respect to each other, so that the sections approximate a circular path. The polarity of the magnets of the secondary part reverses itself from magnet to magnet across the sections as well. This causes interference in the periodicity of the magnetic field of the secondary part at the transitions from one section to the next, and higher cogging forces are produced in comparison with the linear scenario.

SUMMARY

Example embodiments of the present invention provide an improved magnetic track system for a transport device in an uncomplicated manner, as well as a corresponding transport device, so that a rotor of the transport device can be moved on linear and curved paths using a primary part of a linear motor.

According to an example embodiment of the present invention, a magnetic track system for a transport device for moving a rotor along the magnetic track system includes a plurality of linear sections having an even number of magnets of alternating polarity, which are disposed on a carrier in each case, the magnetic orientation of the magnets in linear regions of the magnetic tracks reversing itself at regular intervals across abutting sections. In curved regions of the magnetic tracks, on the other hand, the polarity of two adjacent magnets, i.e., magnets positioned next to each other, of different sections is the same.

The polarity of the magnets refers to their magnetic orientation. The magnets are magnetized perpendicularly to the plane of the magnetic track system, so that either a magnetic north pole or a magnetic south pole of the individual magnet is facing the rotor or its primary part.

The magnetic track system is thus able to be built from a multitude of always identical sections, as they are also used for a conventional linear motor. Each section includes a support, on which an even number of magnets is situated at regular intervals and with alternating magnetic orientation. By lining up a multitude of such sections or supports, it is possible to produce a magnetic track system of any length, which corresponds to that of a linear motor in the linear regions and furthermore allows very precise positioning of the rotors due to the low cogging forces there. In the curved regions, each second support is installed rotated at approximately 180 degrees with respect to its predecessor about an axis that extends at a right angle to the plane of the magnetic track system. The distance to the adjacent supports is slightly enlarged and the orientation is adapted to the desired curvature. These deviations from the regular periodicity of the magnet system produce slightly greater cogging forces than in the linear regions, which, however, is often acceptable in the curved regions of such transport devices or which is able to be taken into account in the placement of the processing stations.

In other words, the placement of the linear sections or the supports and magnets makes it possible to arrange a magnetic track system for a transport device having linear and curved regions, using conventional components of a magnetic track system of a linear motor. Special components with a particular orientation of the magnets, as in conventional systems, are not necessary. Rotors, each of which includes a primary part of a linear motor, are able to be moved along these magnetic tracks functioning as the secondary part of the linear motor.

Further features and aspects of example embodiments of the present invention are described in more detail below with reference to the appended FIGURE.

BRIEF DESCRIPTION OF THE DRAWING

The FIGURE illustrates a transport device having a magnetic track system, which includes a plurality of identical sections.

DETAILED DESCRIPTION

As illustrated in the FIGURE, an individual section A has a support T and an even number of magnets M provided on support T transversely to the direction of magnetic tracks B. Magnets M are disposed on support T at regular intervals or distances p and with alternating polarities. A rotor L, which includes the primary part of a linear motor according to, e.g., conventional systems, is driven and positioned along the magnetic tracks.

Each support T has a marking F, which allows an identification of the polarity of magnets M. In the FIGURE, two corners of each support T are beveled for this purpose. When viewing a section A such that markings F lie on the upper edge of support T, a magnetic north pole points to rotor L on left magnet M.

To the left of the perpendicular dotted line, magnetic track system B has a linear region. Sections A are arranged next to each other, as usual for a linear motor, so that a linear magnetic track system results overall, in which the magnetic orientation of magnets M reverses itself at regular intervals p across abutting sections A. These intervals p are also referred to as pole spacing p or pole pitch. Markings F of supports T are always situated on the same side of magnetic track system B. The sequence of the magnetic orientation of the 16 magnets M of two sections A thus is as follows:

N-S-N-S-N-S-N-S-N-S-N-S-N-S-N-S, the hyphens indicating a pole pitch p in each case.

In contrast, to the right of the perpendicular dotted line, each second support T in the curved region of magnetic track system B is rotated by slightly more than 180 degrees in relation to its predecessor, about an axis perpendicular to the plane of magnetic track system B, which can be seen from the beveled corners of supports T and also from the indicated polarity of magnets M. Markings F of two adjacent sections A lie on different sides of magnetic track system B.

Two adjacent magnets M of adjoining sections thus have the same polarity:

N-S-N-S-N-S-N-S-x-S-N-S-N-S-N-S-N,

"x" between the two adjacent south poles denoting an enlarged interval, which thus is greater than pole pitch p between magnets M within a section A. This is attributable to the fact that the two sections A have to be placed at a certain angle with respect to each other, which is a function of the radius of curvature R of magnetic track system B. The enlarged clearance is selected such that the cogging forces additionally produced by the curvature of magnetic track system B are restricted. To do so, two sequential sections A having k magnets with a pole pitch p are positioned so that their centers on an imaginary circular path having radius R (corresponding to the desired profile of magnetic track system B) have a distance of $p*(k+1)$, while this distance is $p*k$ in the linear case.

Magnets M of a section A intersect the tangent to the imaginary circular path extending through the center of the section at a right angle. The center of a section A is the area center of gravity of magnets M of a section A. That is to say, while the sections are arranged in steps of $p*k$ in linear regions of circular path B, this distance increases by one pole pitch to $p*(k+1)$ in curved regions.

Compared with the placement of magnets M on a linear magnetic track system B, a north pole N is therefore missing in the above example, which results in additional cogging forces. However, the then following south pole S sits approximately at the location at which the next south pole would follow in the linear case. The cogging forces additionally produced by the curvature of magnetic track system B are restricted in this manner.

If a position measuring device for rotors L moved on magnetic tracks B lies along the plotted magnetic track system B, which intersects magnets M in the center, then a position controller for rotors L can treat the linear and curved regions of magnetic track system B in completely the same manner. No measures with regard to the energization of the motor phases of the primary parts in rotors L as a function of the current location will then be necessary. Such a position measuring device may include a measuring tape having an optically readable graduation structure, which is installed along magnetic track system B and scanned by optical scanning heads on rotors L, so that the actual position of each rotor L can be determined. The position ascertained in this manner may be used in, e.g., a conventional manner in a closed-loop control circuit.

At a given number k of magnets M per section A and a given pole pitch p, the number n of sections A on the circular arc defines its possible radius of curvature R. The following applies to a circular arc over an angle of 180 degrees, by which the direction of a rotor L is able to be reversed:

$$R=(p*(n*(k+1)+1))/\pi$$

For example, using nine sections A having eight magnets M in each case, which are placed at a magnetic period of 32 mm (i.e., a pole pitch p of 16 mm), it is therefore possible to cover a semicircle having a radius of approximately 418 mm.

More generally, the following applies to the relationship of these variables for a circular arc that defines a random angle α:

$$R=(p*(n*(k+1)+1))/\alpha,$$

angle α having to be inserted in the measurement in radius.

What is claimed is:

1. A magnetic track system for a transport device for moving a rotor along the magnetic track system, comprising:
    a plurality of linear sections, each section having an even number of magnets of alternating polarity arranged on a support, the polarity of adjacent magnets reversing itself at regular intervals across abutting sections in linear regions of the magnetic track system, the polarity of two adjacent magnets of different sections being the same in curved regions of the magnetic track system;
    wherein the sections are positioned in steps of $k*p$ on the magnetic track system in linear regions of the magnetic track system, and the sections are positioned in steps of $p*(k+1)$ on the magnetic track system in curved regions of the circular path, k representing the number of magnets of a section and p represents a pole pitch of the magnets.

2. The magnetic track system according to claim 1, wherein the magnetic track system includes a plurality of identical linear sections.

3. The magnetic track system according to claim 1, wherein the relationship:

$$R=(p*(n*(k+1)+1))/\alpha$$

is satisfied for a curved region of the magnetic track system, R representing a radius of curvature of the magnetic track system in the curved region, α representing an angle enclosing the curved region, k representing the number of magnets of a section, p representing a pole pitch of the magnets, and n representing the number of sections in the curved region.

4. A transport device, comprising:
a linear drive including:
  a magnetic track system arranged as a secondary part of the linear drive, the magnetic track system including a plurality of linear sections, each section having an even number of magnets of alternating polarity arranged on a support, the polarity of adjacent magnets reversing itself at regular intervals across abutting sections in linear regions of the magnetic track system, the polarity of two adjacent magnets of different sections being the same in curved regions of the magnetic track system; and
  a rotor including a primary part of the linear drive oriented toward the magnetic track system;
wherein the sections are positioned in steps of k*p on the magnetic track system in linear regions of the magnetic track system, and the sections are positioned in steps of p*(k+1) on the magnetic track system in curved regions of the circular path, k representing the number of magnets of a section and p represents a pole pitch of the magnets.

5. The transport device according to claim 4, wherein the magnetic track system includes a plurality of identical linear sections.

6. The transport device according to claim 4, wherein the relationship:

$$R=(p*(n*(k+1)+1))/\alpha$$

is satisfied for a curved region of the magnetic track system, R representing a radius of curvature of the magnetic track system in the curved region, α representing an angle enclosing the curved region, k representing the number of magnets of a section, p representing a pole pitch of the magnets, and n representing the number of sections in the curved region.

* * * * *